United States Patent [19]

Itoh et al.

[11] Patent Number: 5,376,486

[45] Date of Patent: Dec. 27, 1994

[54] ELECTROPHOTOGRAPHIC PHOTORECEPTOR WITH AZO COMPOUND HAVING PARTICULAR COUPLER

[75] Inventors: Akira Itoh; Hideki Nagamura, both of Tokyo, Japan

[73] Assignee: Mitsubishi Paper Mills Limited, Tokyo, Japan

[21] Appl. No.: 76,198

[22] Filed: Jun. 14, 1993

[30] Foreign Application Priority Data

Jun. 17, 1992 [JP] Japan .................................. 4-158095
Jul. 6, 1992 [JP] Japan .................................. 4-178551

[51] Int. Cl.$^5$ ........................ G03G 15/02; G03G 5/00
[52] U.S. Cl. ......................................... 430/58; 430/59; 430/70; 430/71; 430/72; 430/75; 430/76; 430/77; 430/78; 430/79; 430/83
[58] Field of Search ........................ 430/70, 71, 72, 75, 430/76, 77, 78, 79, 58, 83

[56] References Cited

U.S. PATENT DOCUMENTS

| | | | |
|---|---|---|---|
| 4,702,983 | 10/1987 | Haino et al. | 430/76 X |
| 4,810,608 | 3/1989 | Ueda | 430/76 X |
| 4,822,704 | 4/1989 | Akasaki et al. | 430/72 X |
| 4,945,021 | 7/1990 | Takata et al. | 430/78 X |
| 4,956,255 | 9/1990 | Ueda | 430/71 X |
| 5,097,022 | 3/1992 | Sasaki et al. | 430/79 X |
| 5,246,805 | 9/1993 | Miyazaki et al. | 430/72 X |
| 5,275,898 | 1/1994 | Kuroda et al. | 430/75 X |

*Primary Examiner*—Roland Martin
*Attorney, Agent, or Firm*—Cushman, Darby & Cushman

[57] ABSTRACT

The present invention provides an electrophotographic photoreceptor high in sensitivity and endurance and highly resistant against oxidizing action with ozone or the like which comprises an electrically conductive support and, provided thereon, a light-sensitive layer which contains at least one azo compound containing a coupler component represented by the following formula [I] or [II]:

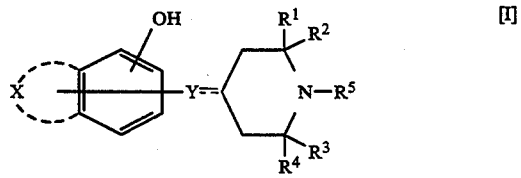

wherein X represents a heterocyclic or aromatic ring residue which may have a substituent fusing with the benzene ring, Y represents a linkage group, $R^1$-$R^4$ each represents a hydrogen atom or an alkyl group and $R^5$ represents a hydrogen atom or an alkyl, aralkyl or acyl group which may have a substituent;

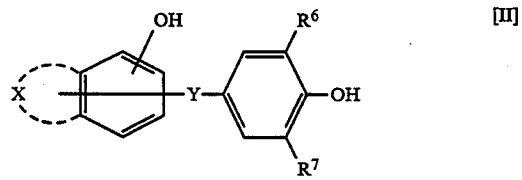

wherein X and Y are as defined above and $R^6$ and $R^7$ each represents a hydrogen atom or an alkyl group which may have a substituent.

8 Claims, No Drawings

ELECTROPHOTOGRAPHIC PHOTORECEPTOR WITH AZO COMPOUND HAVING PARTICULAR COUPLER

BACKGROUND OF THE INVENTION

The present invention relates to an electrophotographic photoreceptor which contains an azo compound containing a novel coupler component.

Hitherto, as photoconductive substances for electrophotogrpahic photoreceptors, there have been known and widely studied and used inorganic photoconductive substances such as selenium, cadmium sulfide, zinc oxide and silicon. These inorganic substances have many merits, but on the other hand have various defects. For example, selenium has the defects such as severe production conditions and tendencies to crystallize by heat or mechanical shock. Cadmium sulfide and zinc oxide are insufficient in moisture resistance and endurance. Silicon is said to be low in chargeability and have difficulties in its production. Selenium and cadmium sulfide have the further problem of toxicity.

On the other hand, organic photoconductive substances have advantages such as good film-formability, superior flexibility, light weight, high transparency and easy design of photoreceptors applicable to a wide wavelength region by using proper sensitizing methods and are increasingly put to practical use.

Fundamental properties required for electrophotographic photoreceptors include (1) high chargeability when exposed to corona discharge in the dark, (2) less leakage, in the dark, of the charge obtained (dark decay), (3) rapid release of the charge when exposed to light (light decay) and (4) little residual charge after exposed to light.

Although many researches have been made on photoconductive polymers such as polyvinylcarbazole to be used as organic photoconductive substances, these are not satisfactory in film-forming properties, flexibility and adhesiveness and do not fully meet the above mentioned fundamental requirements.

On the other hand, photoreceptors excellent in mechanical properties such as film-forming properties and flexibility can be obtained with organic low molecular photoconductive compounds by selecting binders used for preparing photoreceptors, but it has been difficult to find compounds suitable to maintain the characteristic of high sensitivity.

In order to solve these problems, organic photoreceptors having higher sensitivity have been developed by allotting the carrier generation function and the carrier transport function on separate materials. The characteristic of these photoreceptors which are called function-separated type photoreceptors is that materials suitable for the respective functions can be selected from a wide variety of materials and photoreceptors having optional performances can be easily produced. Thus, intensive research has been made thereon.

As stated above, development of novel materials or combination of them and various improvements have been made for meeting the requirements such as fundamental properties and endurance demanded for electrophotographic photoreceptors. However, the improvements have not yet reached sufficient levels.

One serious problem is that when the photoreceptors are actually used in a copier, they undergo a strong oxidizing action of ozone generated from a charger. Photoreceptors comprising organic materials readily undergo this oxidizing action to cause decrease in chargeability or sensitivity. For solving this problem it has been proposed to add various antioxidants to the photoreceptors. However, such method is not necessarily effective and rather causes problems such as deterioration in sensitivity and increase in residual potential. As a result of extensive research on deterioration of photoreceptors conducted by the inventors, it has been found that the oxidation reaction in the area at which a carrier generation material and a carrier transport material contact exerts a serious adverse effect upon the electrophotographic characteristics of the whole photoreceptor and it has been elucidated that the oxidizing action can be effectively inhibited by using azo compounds containing a specific coupler component having an antioxidizing action.

SUMMARY OF THE INVENTION

The object of the present invention is to provide an electrophotographic photoreceptor which has a high chargeability and sensitivity, shows substantially no reduction in chargeability and sensitivity even after repeated use and is high in resistance against the oxidizing action of ozone or the like.

The inventors have studied photoconductive materials having high sensitivity and high endurance and found that an azo compound containing a novel coupler represented by the following formula [I] or [II] is effective.

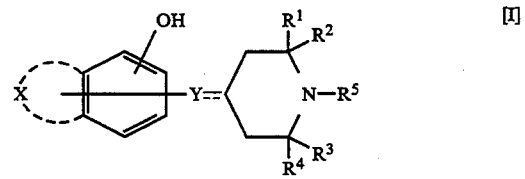

(wherein X represents a heterocyclic or aromatic ring residue which may have a substituent fusing with benzene ring, Y represents a linkage group, $R^1$-$R^4$ each represents a hydrogen atom or an alkyl group, and $R^5$ represents a hydrogen atom or an alkyl, aralkyl or acyl group which may have a substituent).

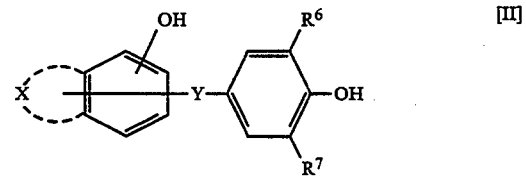

(wherein X represents a heterocyclic or aromatic ring residue which may have a substituent fusing with benzene ring, Y represents a linkage group and $R^6$ and $R^7$ each represents a hydrogen atom or an alkyl group which may have a substituent).

DESCRIPTION OF THE INVENTION

Examples of the aromatic ring and heterocyclic ring represented by X in the formulas [I] and [II] are benzene ring, methylbenzene ring, methoxybenzene ring, chlorobenzene ring, naphthalene ring, anthracene ring, furan ring, pyridine ring, ethylpyridine ring, carbazole ring, quinoline ring, benzothiophene ring, chlorobenzothiophene ring, benzofuran ring and benzocarbazole ring. Examples of Y in the formulas [I] and [II] are groups as shown in the structural formulas of the couplers represented by the formulas [I] and [II] exemplified below. Examples of $R^1$-$R^4$ in the formula [I] are hydrogen atom and alkyl groups such as methyl group, ethyl group and isopropyl group. Examples of $R^5$ in the formula [I] are hydrogen atom, alkyl groups such as methyl group, ethyl group, 2-chloroethyl group and 2-hydroxyethyl group, aralkyl groups such as benzyl group, 4-methylbenzyl group, 4-chlorobenzyl group and 2-phenylethyl group and acyl groups such as formyl group, acetyl group and benzoyl group. Examples of $R^6$ and $R^7$ in the formula [II] are hydrogen atom and alkyl groups such as methyl group, ethyl group, isopropyl group, t-butyl group and t-amyl group.

Typical examples of the couplers represented by the formulas [I] are enumerated below.

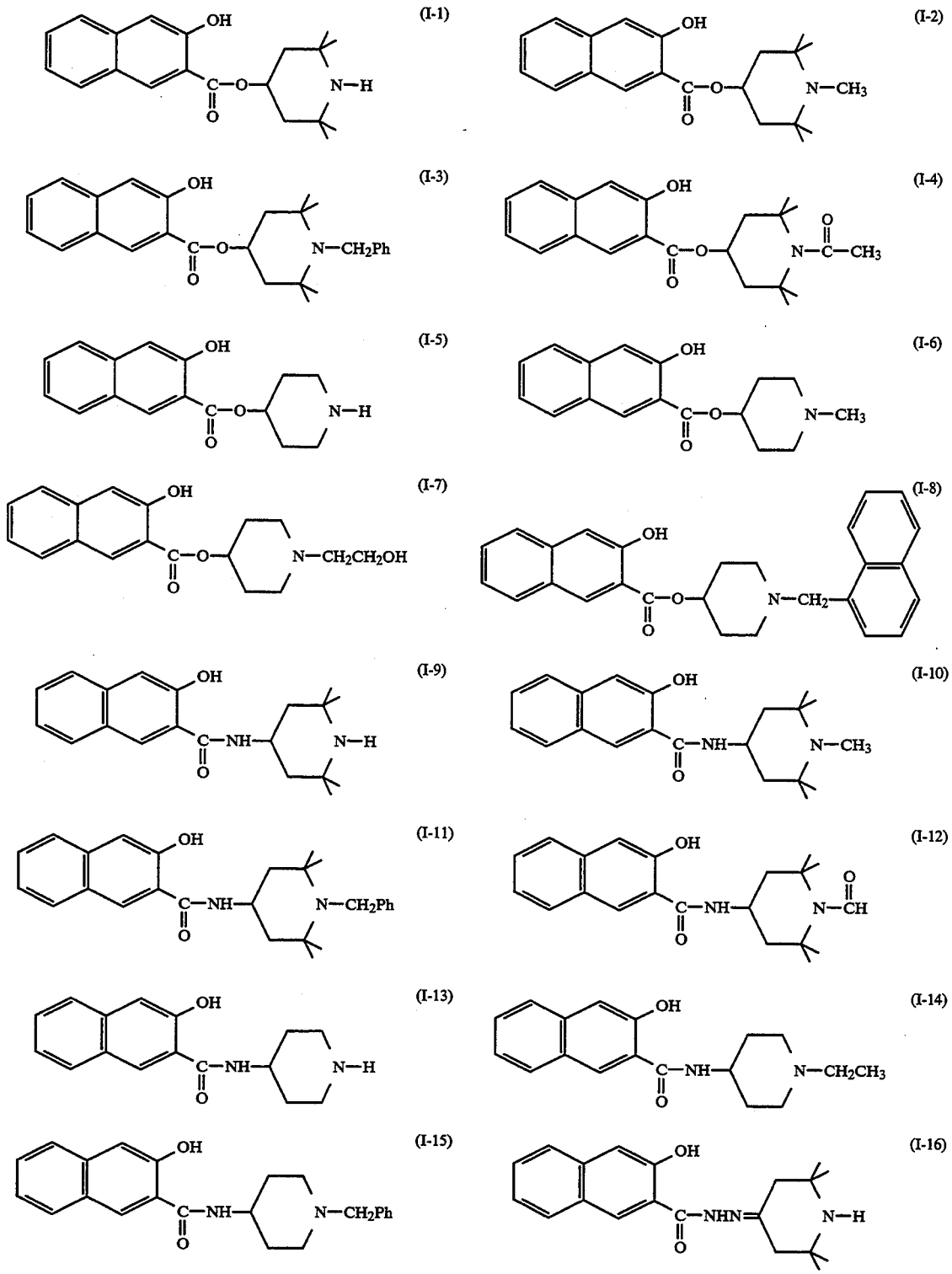

-continued
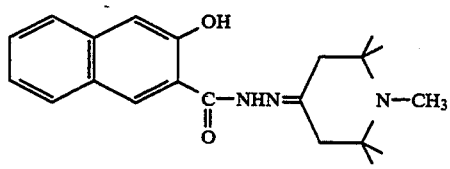 (I-17)
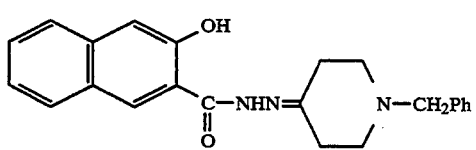 (I-18)
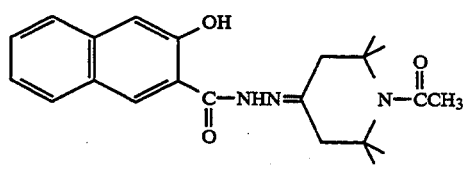 (I-19)
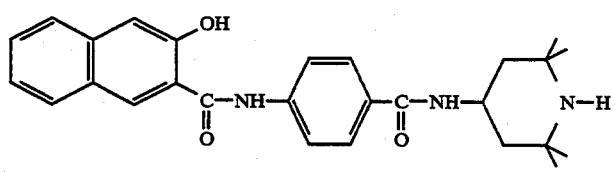 (I-20)
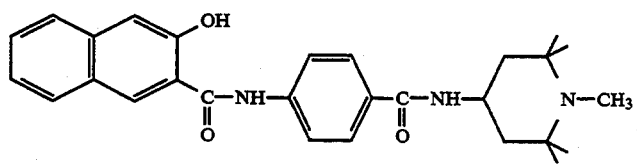 (I-21)
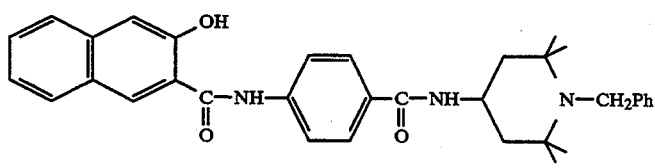 (I-22)
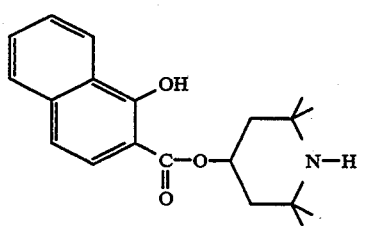 (I-23)
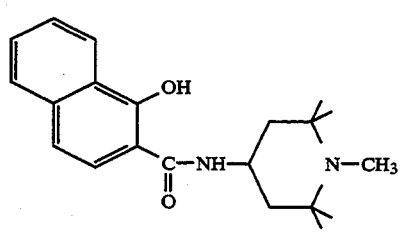 (I-24)
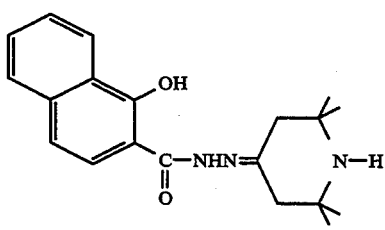 (I-25)
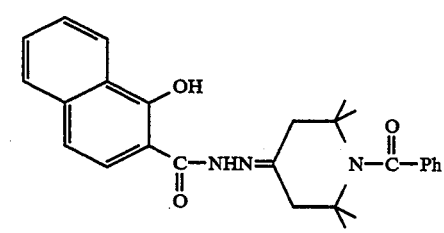 (I-26)
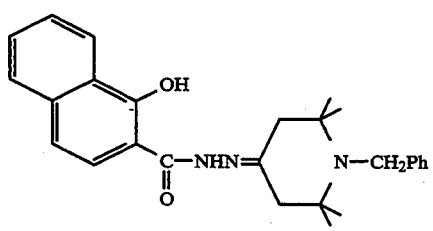 (I-27)
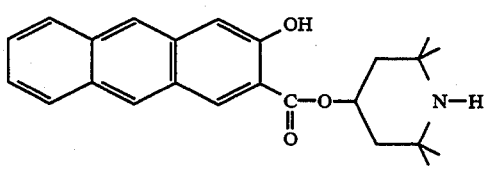 (I-28)

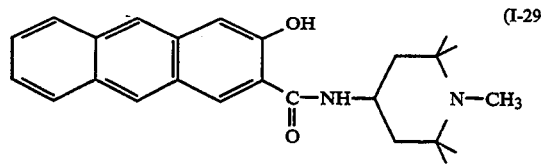 (I-29)
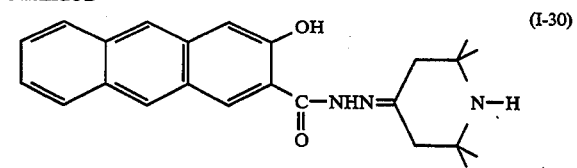 (I-30)
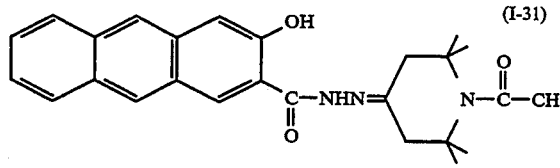 (I-31)
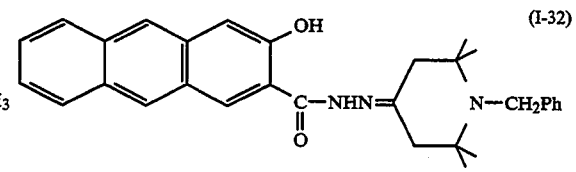 (I-32)
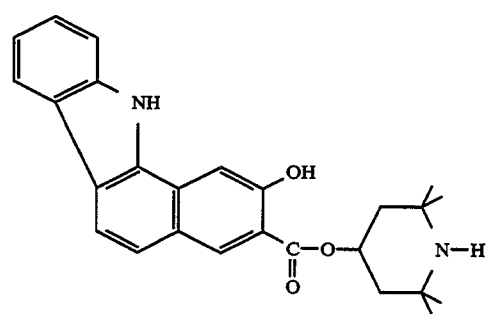 (I-33)
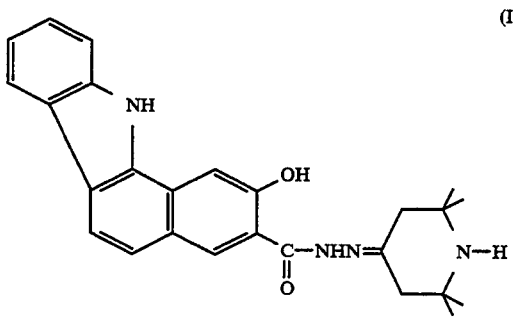 (I-35)
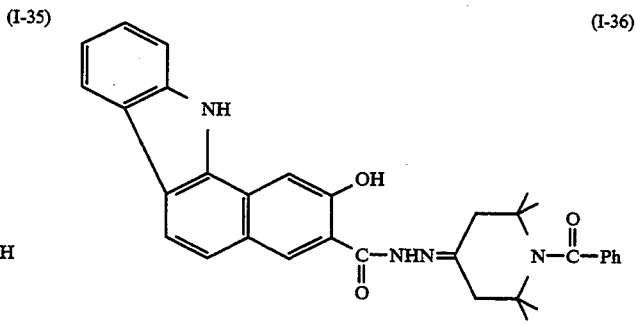 (I-36)
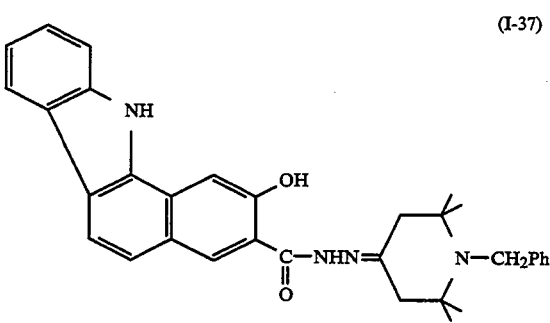 (I-37)
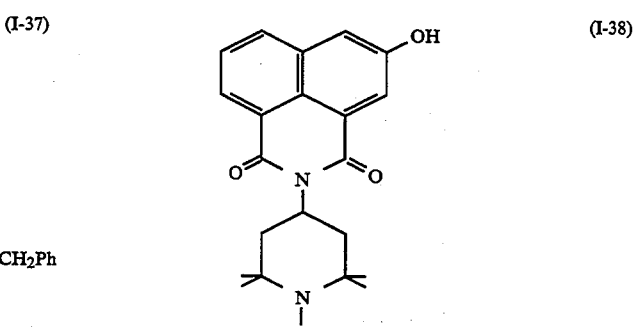 (I-38)
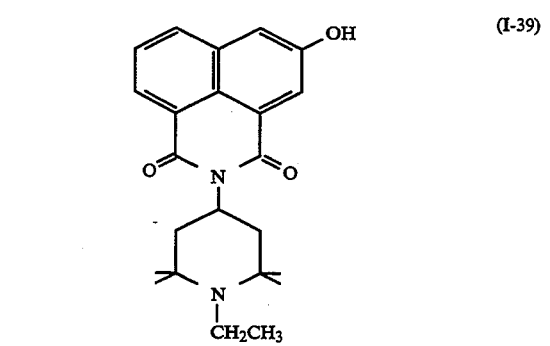 (I-39)
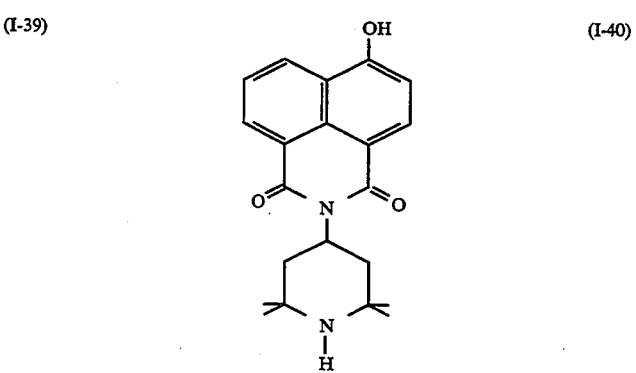 (I-40)

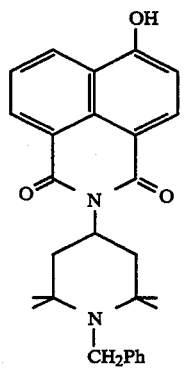
(I-41)
Typical examples of the couplers represented by the formulas [II] are enumerated below.
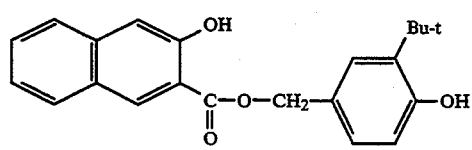
(II-1)
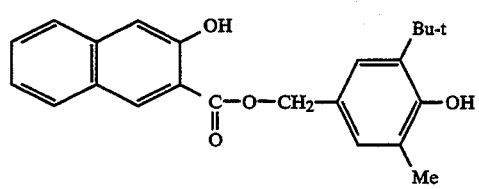
(II-2)
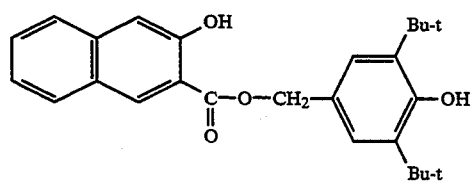
(II-3)
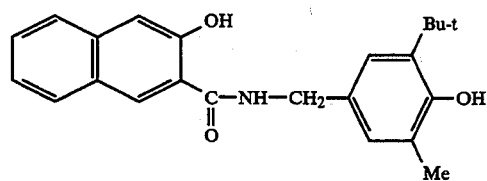
(II-4)
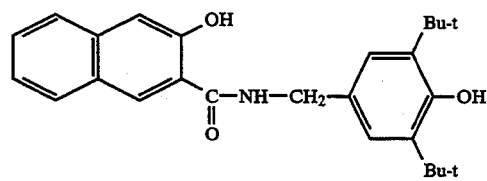
(II-5)
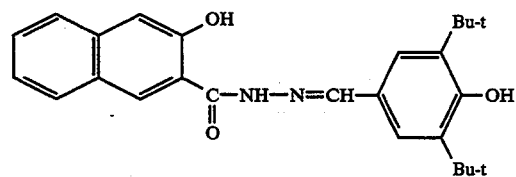
(II-6)

-continued
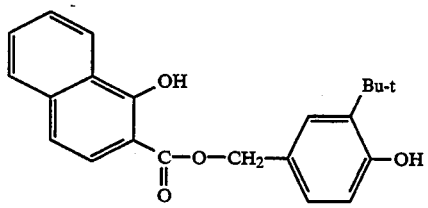
(II-7)
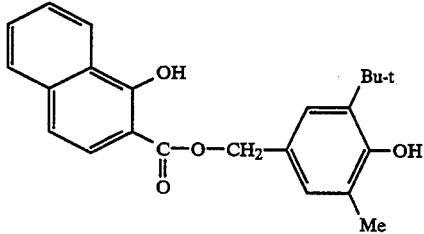
(II-8)
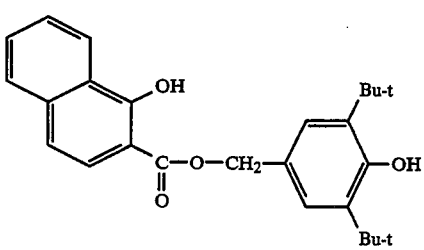
(II-9)
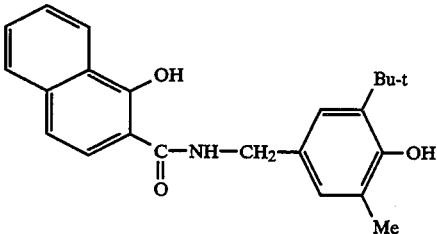
(II-10)
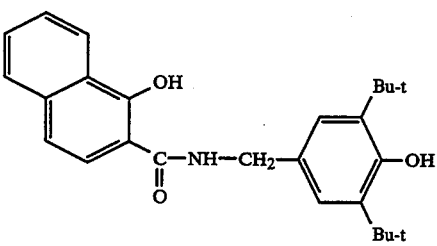
(II-11)
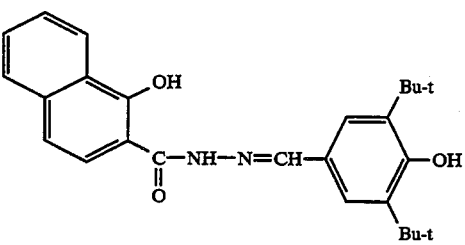
(II-12)
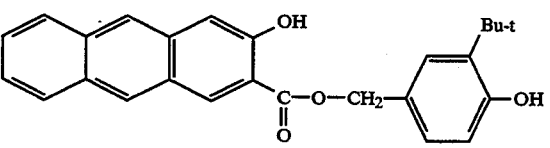
(II-13)

-continued
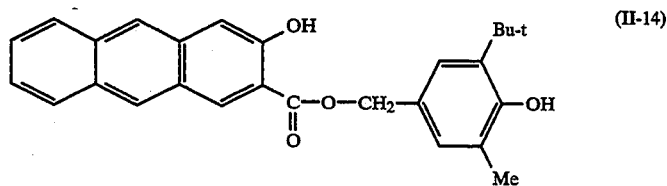
(II-14)
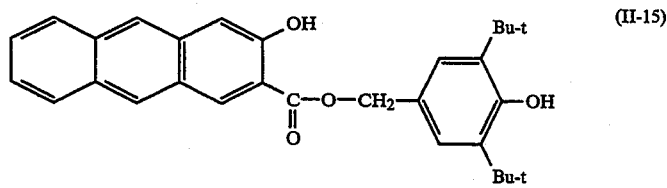
(II-15)
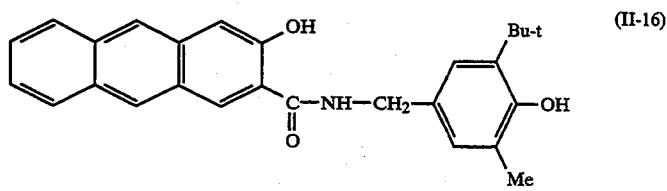
(II-16)
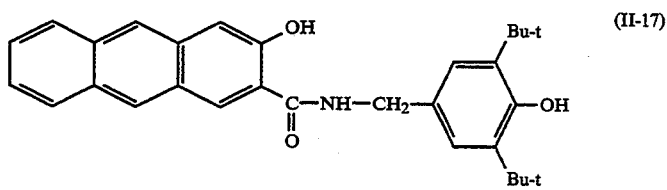
(II-17)
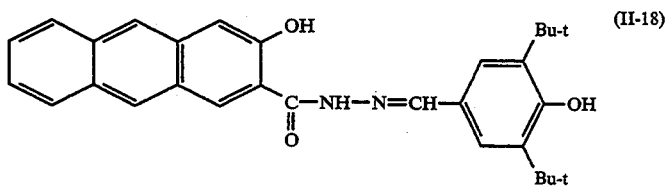
(II-18)
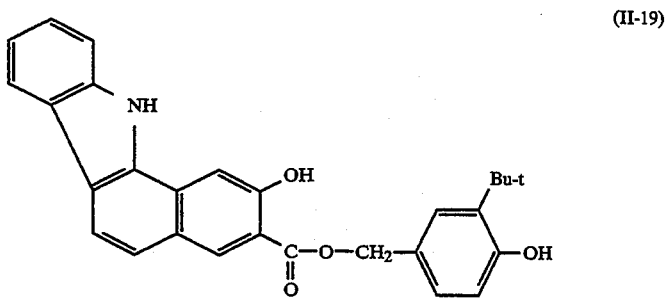
(II-19)
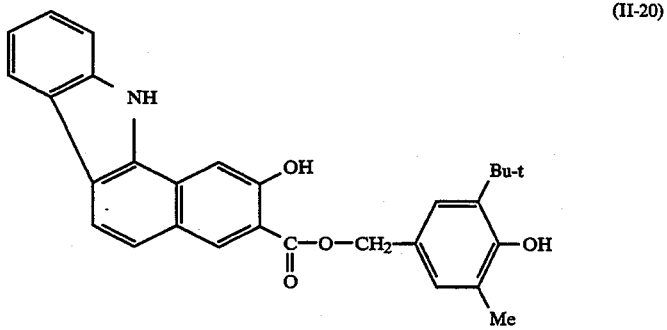
(II-20)

-continued
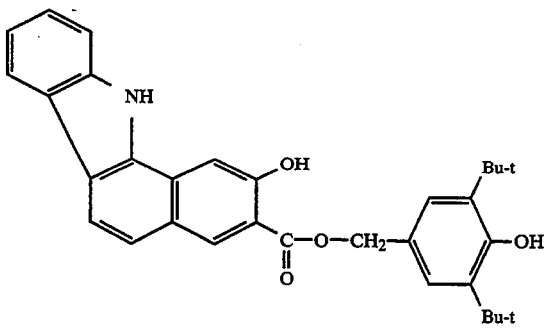
(II-21)
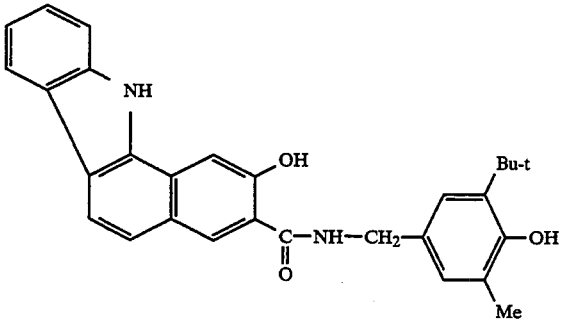
(II-22)
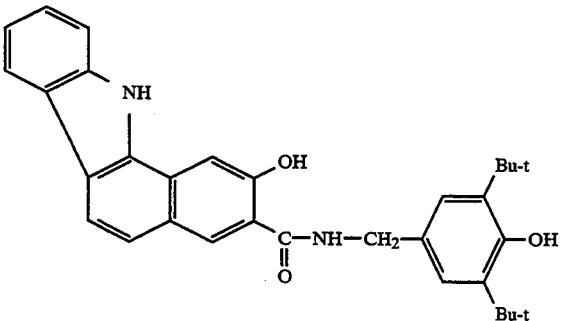
(II-23)
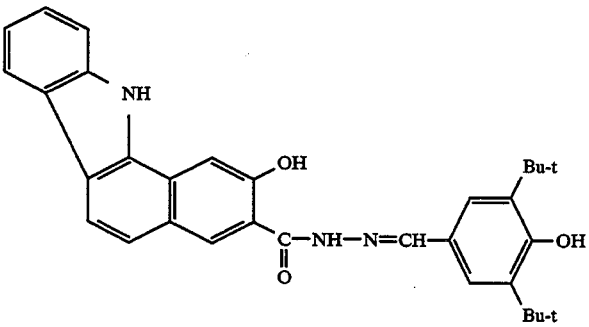
(II-24)
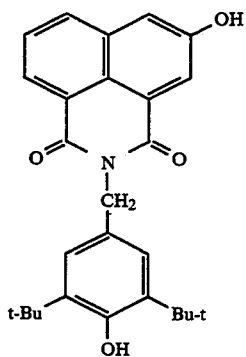
(II-25)

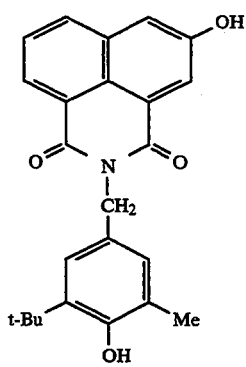
(II-26)

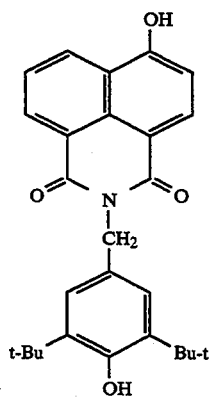
(II-27)

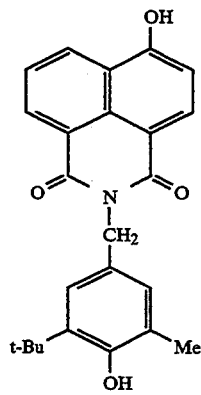
(II-28)

The couplers represented by the formula [I] or [II] may be used each alone, but preferably used in combination with other couplers. The preferred azo pigments in this case can be prepared by diazotizing an amine represented by the following formula by a known process and reacting the resulting diazotized solution with a mixture of the coupler represented by the above formula [I] or [II] and the other coupler in the presence of an alkali.

(wherein Z represents an organic residue and n represents an integer of 1 to 4).

The mixing molar ratio of the coupler represented by the formula [I] or [II] and the other coupler when used in combination is preferably 0.1:99.9 to 20:80. If the amount of the former is less than said ratio, the effect is small and if it is too much, decrease in sensitivity is brought about.

Examples of the azo pigments containing the couplers represented by the formulas [I] or [II] are shown below. In these structural formulas, A denotes the coupler represented by the formula [I] or [II] or the other coupler.

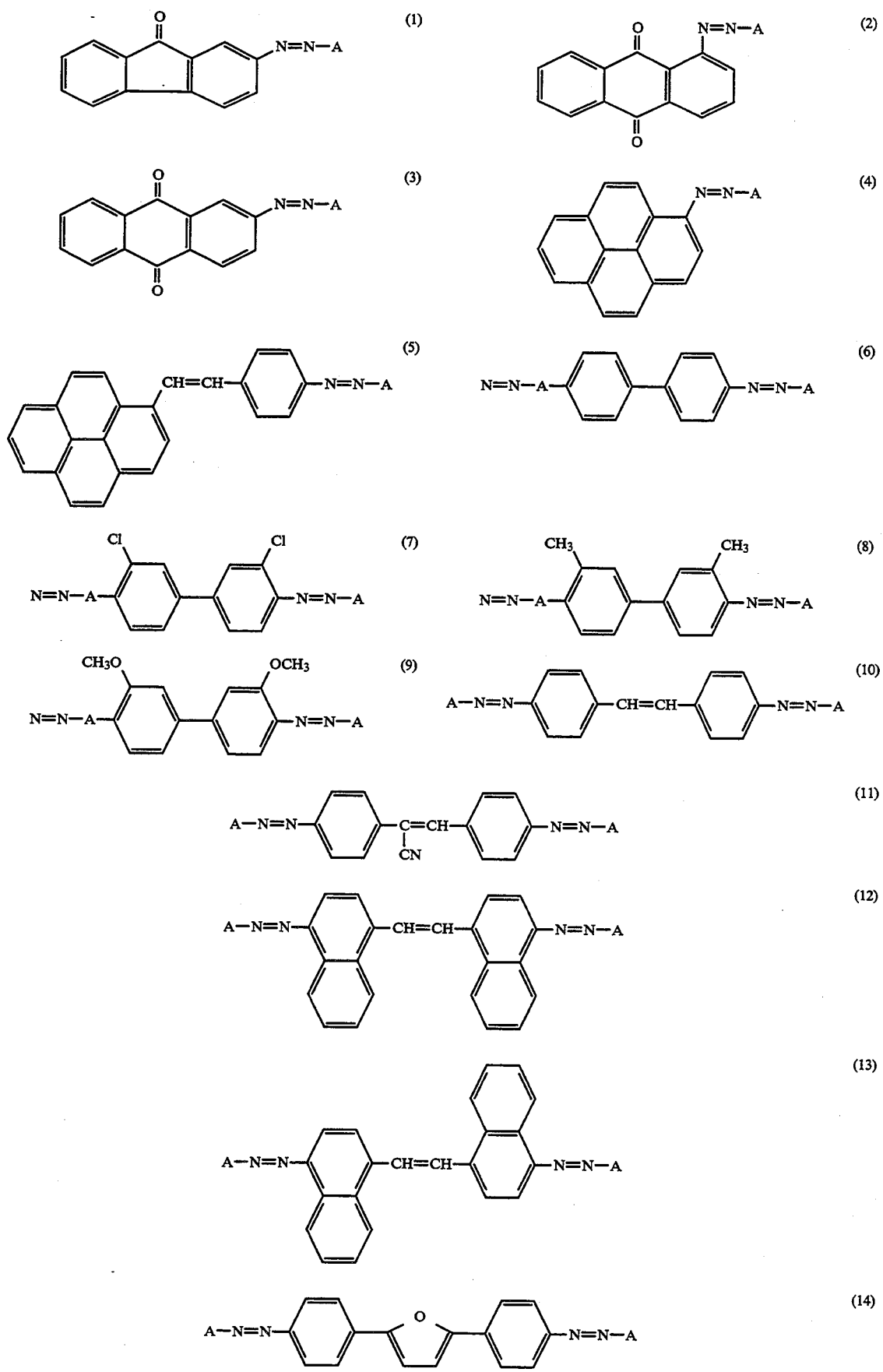

-continued
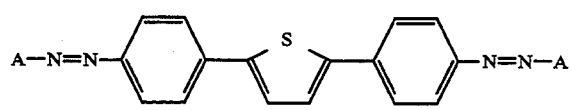 (15)
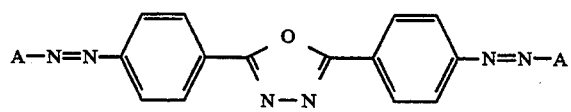 (16)
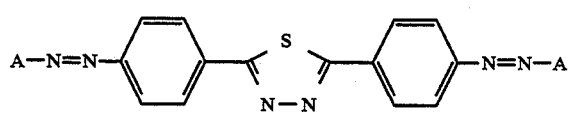 (17)
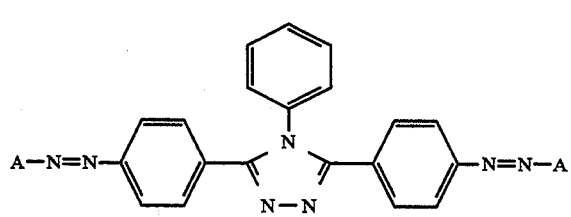 (18)
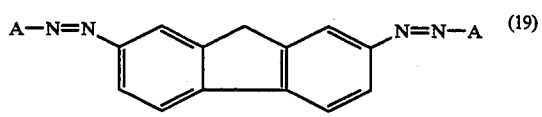 (19)
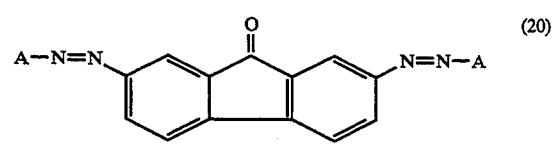 (20)
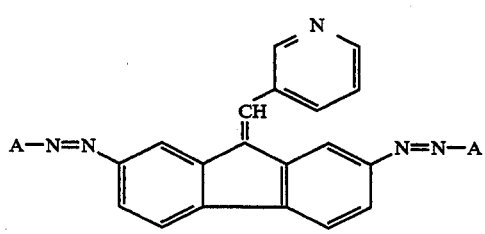 (21)
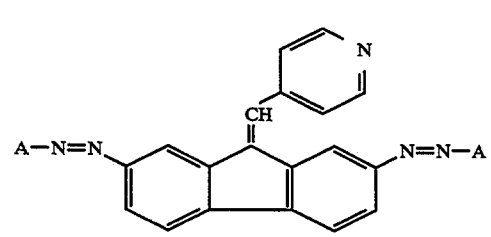 (22)
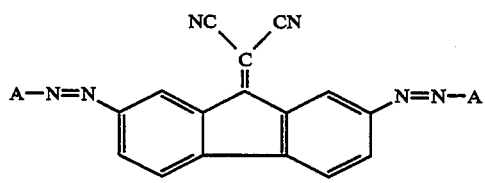 (23)
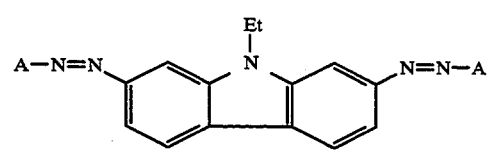 (24)
 (25)
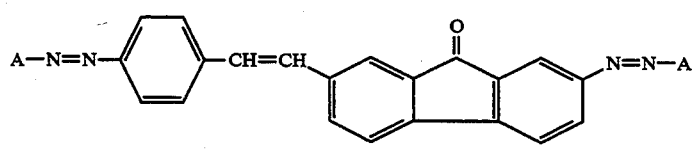 (26)
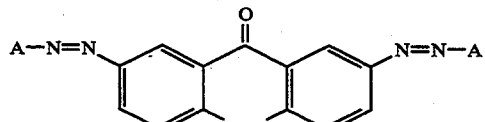 (27)
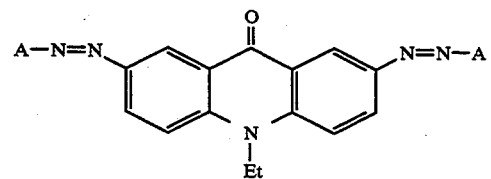 (28)

-continued
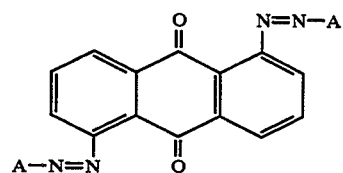 (29)
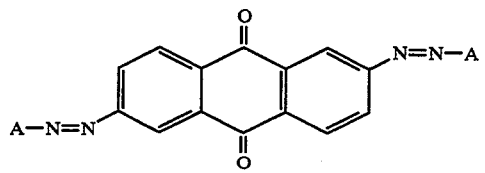 (30)
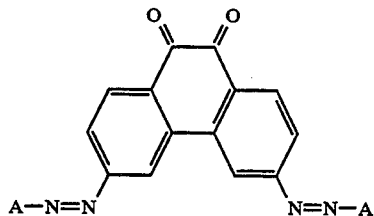 (31)
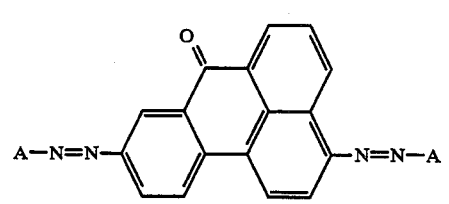 (32)
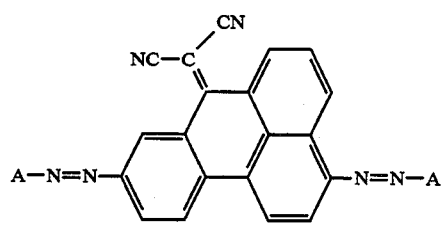 (33)
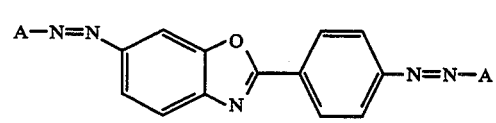 (34)
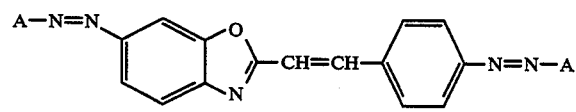 (35)
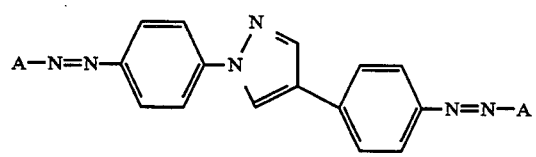 (36)
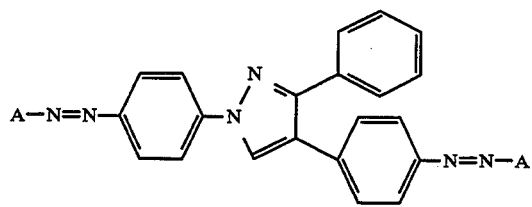 (37)
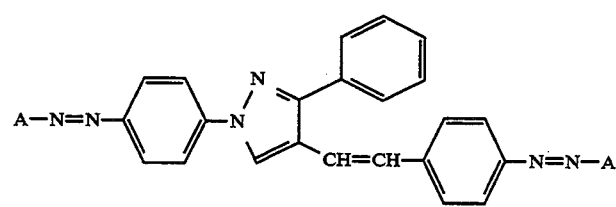 (38)
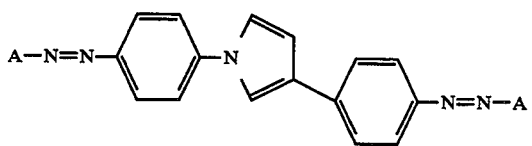 (39)

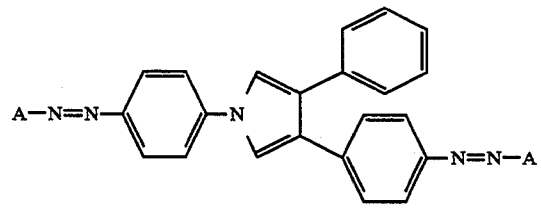 (40)
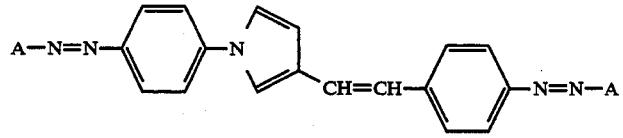 (41)
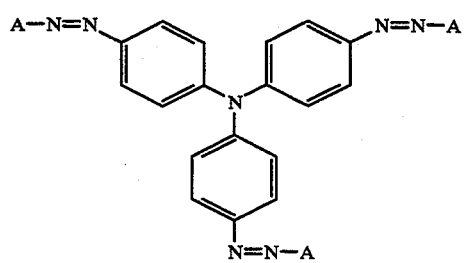 (42)
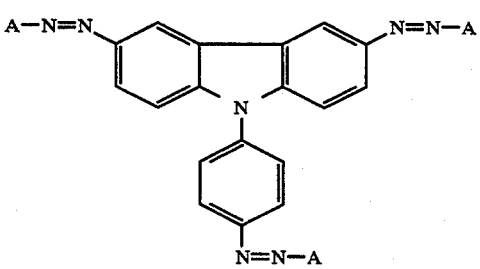 (43)
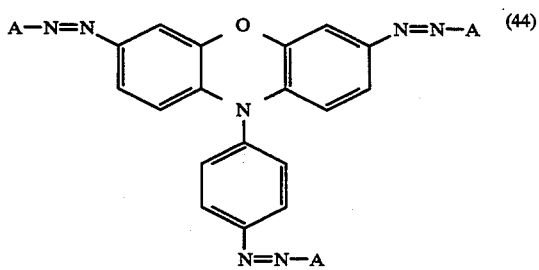 (44)
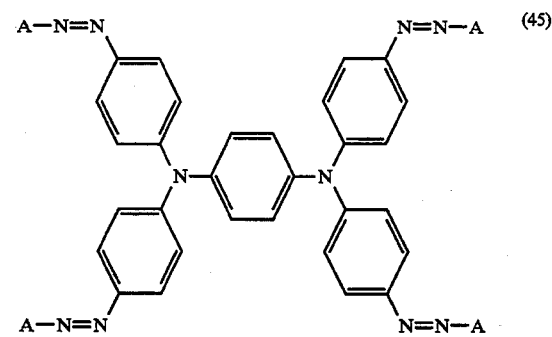 (45)
As examples of the other couplers which can be used in combination with the coupler represented by the formula [I] or [II], mention may be made of those which have the structural formulas as shown in the following Tables 1-3.

TABLE 1

| —Ar | A-1 (OH/CONHAr naphthyl-Me) | A-2 (OH/CONHAr phenoxy-Me) | A-3 (NH-phenyl OH/CONHAr-Me) | A-4 (OH/CONHAr anthryl-Me) | A-5 (NH-phenyl OH/CONHAr naphthyl-Me) |
|---|---|---|---|---|---|
| phenyl | A-1 | A-2 | A-3 | A-4 | A-5 |
| 2-Me-phenyl | A-6 | A-7 | A-8 | A-9 | A-10 |
| 3-Me-phenyl | A-11 | A-12 | A-13 | A-14 | A-15 |
| 4-Me-phenyl | A-16 | A-17 | A-18 | A-19 | A-20 |
| 2-Cl-phenyl | A-21 | A-22 | A-23 | A-24 | A-25 |
| 3-Cl-phenyl | A-26 | A-27 | A-28 | A-29 | A-30 |
| 4-Cl-phenyl | A-31 | A-32 | A-33 | A-34 | A-35 |
| 2-CF₃-phenyl | A-36 | A-37 | A-38 | A-39 | A-40 |

TABLE 1-continued

| —Ar | [naphthol-CONHAr with methyl] | [phenoxy-naphthol-CONHAr] | [NH-phenyl-naphthol-CONHAr] | [anthracene-naphthol-CONHAr] | [NH-phenyl-anthracene-naphthol-CONHAr] |
|---|---|---|---|---|---|
| 3-CF₃-C₆H₄ | A-41 | A-42 | A-43 | A-44 | A-45 |
| 4-CF₃-C₆H₄ | A-46 | A-47 | A-48 | A-49 | A-50 |
| 2-NO₂-C₆H₄ | A-51 | A-52 | A-53 | A-54 | A-55 |
| 3-NO₂-C₆H₄ | A-56 | A-57 | A-58 | A-59 | A-60 |
| 4-NO₂-C₆H₄ | A-61 | A-62 | A-63 | A-64 | A-65 |
| 2-CN-C₆H₄ | A-66 | A-67 | A-68 | A-69 | A-70 |
| 3-CN-C₆H₄ | A-71 | A-72 | A-73 | A-74 | A-75 |
| 4-CN-C₆H₄ | A-76 | A-77 | A-78 | A-79 | A-80 |

TABLE 1-continued

| —Ar | A (naphthol-Me-CONHAr) | A (phenoxy-Me-OH-CONHAr) | A (NH-Me-OH-CONHAr) | A (anthracene-Me-OH-CONHAr) | A (NH-naphthalene-Me-OH-CONHAr) |
|---|---|---|---|---|---|
| 2-Br-phenyl | A-81 | A-82 | A-83 | A-84 | A-85 |
| 3-Br-phenyl | A-86 | A-87 | A-88 | A-89 | A-90 |
| 4-Br-phenyl | A-91 | A-92 | A-93 | A-94 | A-95 |
| 2-OMe-phenyl | A-96 | A-97 | A-98 | A-99 | A-100 |
| 3-OMe-phenyl | A-101 | A-102 | A-103 | A-104 | A-105 |
| 4-OMe-phenyl | A-106 | A-107 | A-108 | A-109 | A-110 |
| 2-Et-phenyl | A-111 | A-112 | A-113 | A-114 | A-115 |
| 2-Ph-phenyl | A-116 | A-117 | A-118 | A-119 | A-120 |

TABLE 1-continued

| —Ar | A | | | | |
|---|---|---|---|---|---|
| | (OH/CONHAr naphthol) | (OH/CONHAr with O-phenyl) | (OH/CONHAr with NH-phenyl) | (OH/CONHAr anthracene) | (OH/CONHAr with NH-phenyl naphthol) |
| 4-(n-C₃H₇)-phenyl | A-121 | A-122 | A-123 | A-124 | A-125 |
| 2,3-diCl-phenyl | A-126 | A-127 | A-128 | A-129 | A-130 |
| 2,4-diCl-phenyl | A-131 | A-132 | A-133 | A-134 | A-135 |
| 2,5-diCl-phenyl | A-136 | A-137 | A-138 | A-139 | A-140 |
| 3,4-diCl-phenyl | A-141 | A-142 | A-143 | A-144 | A-145 |
| 3,5-diCl-phenyl | A-146 | A-147 | A-148 | A-149 | A-150 |
| 2-CF₃-4-Cl-phenyl | A-151 | A-152 | A-153 | A-154 | A-155 |

TABLE 1-continued

| —Ar | A | | | |
|---|---|---|---|---|
| | OH / CONHAr (naphthalene) | OH / CONHAr (phenoxyphenyl) | OH / CONHAr (with NH-phenyl) | OH / CONHAr (anthracene) | OH / CONH-Ar (with NH-phenyl, methyl) |
| 3-Cl, 4-CF₃-phenyl | A-156 | A-157 | A-158 | A-159 | A-160 |
| 3,5-bis(CF₃)-phenyl | A-161 | A-162 | A-163 | A-164 | A-165 |
| 2-Me, 4-Cl-phenyl | A-166 | A-167 | A-168 | A-169 | A-170 |
| 2-Me, 4-Br-phenyl | A-171 | A-172 | A-173 | A-174 | A-175 |
| 2-Cl, 4-Me-phenyl | A-176 | A-177 | A-178 | A-179 | A-180 |
| 2-Br, 4-Me-phenyl | A-181 | A-182 | A-183 | A-184 | A-185 |
| 3-Me, 4-Cl-phenyl (2-Me) | A-186 | A-187 | A-188 | A-189 | A-190 |

TABLE 1-continued

| —Ar | A | | | |
|---|---|---|---|---|
| | ![OH CONHAr structure] | ![OH CONHAr structure with O-phenyl] | ![NH OH CONHAr structure] | ![NH OH CONHAr with methyl] |
| ![2,6-dimethylphenyl] | A-191 | A-192 | A-193 | A-194 | A-195 |
| ![2,4-dimethylphenyl] | A-196 | A-197 | A-198 | A-199 | A-200 |
| ![2,4,6-trimethylphenyl] | A-201 | A-202 | A-203 | A-204 | A-205 |
| ![thiazolyl] | A-206 | A-207 | A-208 | A-209 | A-210 |
| ![benzothiazolyl] | A-211 | A-212 | A-213 | A-214 | A-215 |
| ![1-naphthyl] | A-216 | A-217 | A-218 | A-219 | A-220 |
| ![2-naphthyl] | A-221 | A-222 | A-223 | A-224 | A-225 |
| ![9-anthryl] | A-226 | A-227 | A-228 | A-229 | A-230 |

TABLE 1-continued

| -Ar | A |  |  |  |
|---|---|---|---|---|
| | (OH/CONHAr naphthalene-Me) | (OH/CONHAr with O-phenyl) | (NH-phenyl/OH/CONHAr-Me) | (naphthalene-Me/OH/CONHAr) | (N-H fused/Me/OH/CONHAr) |
| (anthraquinone-Me, 2-position) | A-231 | A-232 | A-233 | A-234 | A-235 |
| (anthraquinone-Me, 1-position) | A-236 | A-237 | A-238 | A-239 | A-240 |
| (anthraquinone-Me, other) | A-241 | A-242 | A-243 | A-244 | A-245 |
| (carbazole N-Et, Me) | A-246 | A-247 | A-248 | A-249 | A-250 |

TABLE 2

| —A' | A | | | |
|---|---|---|---|---|
| | (4-OH, 3-Me naphthalimide) | (5-OH, 6-Me naphthalimide) | (5-Me, 3-OH pyrazole) | (5-Ph, 3-OH, 4-Me pyrazole) | (3-OH, 1-Me naphthylamine) |
| —Me | A-251 | A-252 | A-253 | A-254 | A-255 |
| —Et | A-256 | A-257 | A-258 | A-259 | A-260 |
| —Ph | A-261 | A-262 | A-263 | A-264 | A-265 |
| 2-Cl-C₆H₄ | A-266 | A-267 | A-268 | A-269 | A-270 |
| 3-Me-C₆H₄ | A-271 | A-272 | A-273 | A-274 | A-275 |
| 4-MeO-C₆H₄ | A-276 | A-277 | A-278 | A-279 | A-280 |
| 3-CF₃-C₆H₄ | A-281 | A-282 | A-283 | A-284 | A-285 |
| 3-NO₂-C₆H₄ | A-286 | A-287 | A-288 | A-289 | A-290 |

TABLE 2-continued

| A | | | | | |
|---|---|---|---|---|---|
| A-291 | A-292 | A-293 | A-294 | A-295 | |
| A-296 | A-297 | A-298 | A-299 | A-300 | |

−A′: 4-cyanophenyl (A-296); 3,5-bis(trifluoromethyl)phenyl

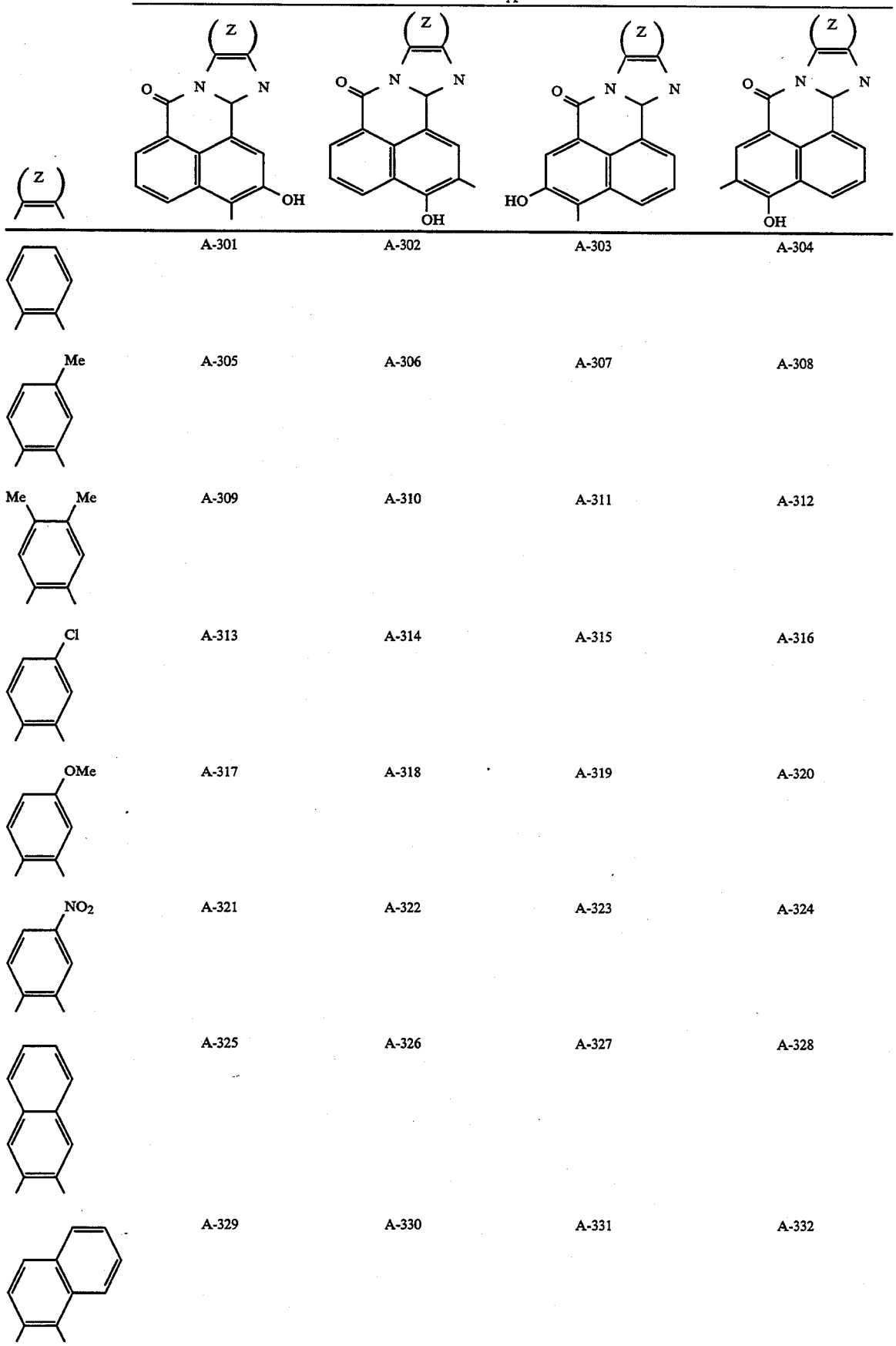

TABLE 3-continued

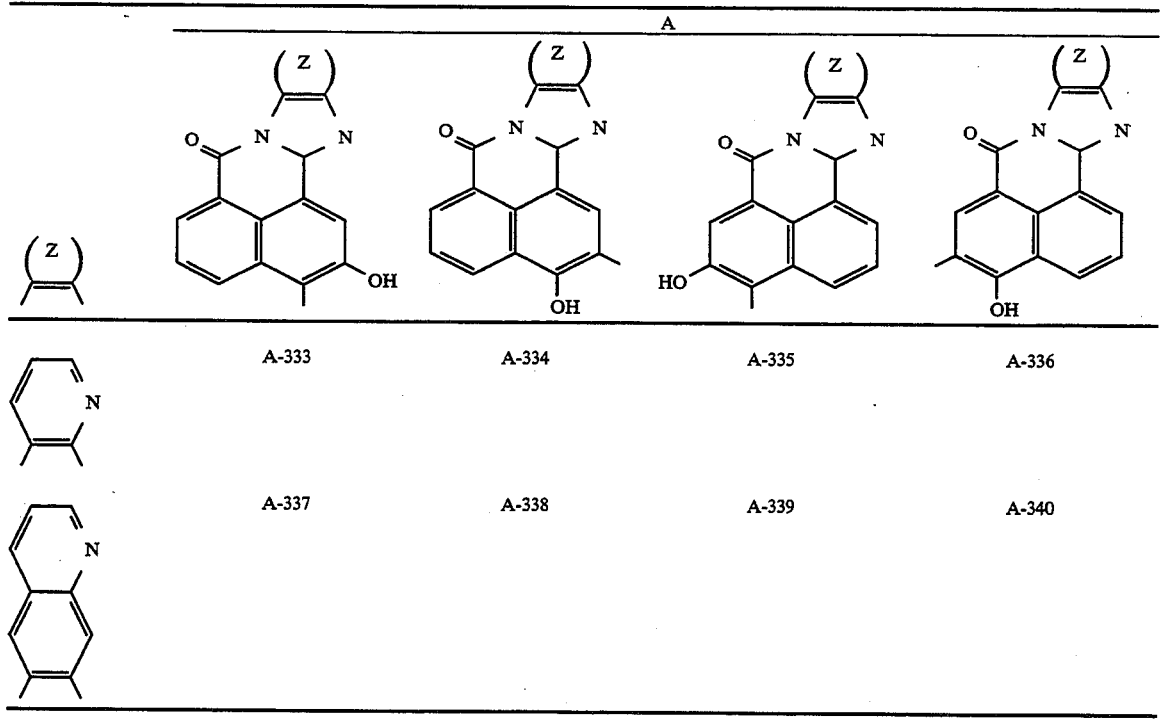

|  | A-333 | A-334 | A-335 | A-336 |
|---|---|---|---|---|
|  | A-337 | A-338 | A-339 | A-340 |

The following are synthesis examples of the couplers and the pigments used in the present invention.

Synthesis Example 1

[Synthesis of coupler (I-9) exemplified hereabove]

Phenyl 3-hydroxy-2-naphthoate (1.32 g) and 4-amino-2,2,6,6-tetramethylpiperidine (1.09 g) were heated at 170° C. for 90 minutes and left for cooling and the precipitated crystal was recrystallized from ethyl acetate (65 ml) to obtain the coupler (I-9).

Yield: 1.27 g Melting point: 219°–222° C.

Synthesis Example 2

[Synthesis of coupler (I-16)]

A mixture of 3-hydroxy-2-naphthoic acid hydrazide (4.04 g), 2,2,6,6-tetramethyl-4-piperidone hydrochloride (3.83 g), sodium acetate (1.64 g) and ethanol (75 ml) was heated for 30 minutes and then left for cooling. The precipitate was subjected to filtration and washed with ethanol and hot water. The crude product was recrystallized from DMF (107 ml) to obtain the coupler (I-16).

Yield: 2.74 g Melting point: 187.9°–188.1° C.

Synthesis Example 3

[Synthesis of coupler (I-18)]

A mixture of 3-hydroxy-2-naphthoic acid hydrazide (4.04 g), N-benzyl-4-piperidone (3.78 g), acetic acid (0.5 ml) and ethanol (75 ml) was heated for 90 minutes and then left for cooling and the precipitate was subjected to filtration. The crude product was recrystallized from dioxane (77 ml) and DMF (5 ml) to obtain the coupler (I-18).

Yield: 5.77 g Melting point: 176.5° C. (dec.)

Synthesis Example 4

[Synthesis of pigment (20) exemplified hereabove wherein coupler: (A-6)+(I-16)]

2,7-Diaminofluorenone (1.89 g) was dissolved in DMF (140 ml) and 6N hydrochloric acid (7.2 ml). To the resulting solution was added an aqueous solution (5 ml) of sodium nitrite (1.5 g) at about 5° C. After 30 minutes, the resulting diazotized solution was added dropwise to a DMF solution (180 ml) of coupler (A-6) (4.74 g), coupler (I-16) (0.31 g) and triethanolamine (9.7 g) at 5°–10° C. over a period of 20 minutes. After the solution was stirred at the same temperature for 2 hours and for further 2 hours at room temperature, the precipitate was subjected to filtration and washed with DMF and water each 900 ml.

Yield: 5.69 g Melting point: 250° C. or higher

Synthesis Example 5

[Synthesis of pigment (33) exemplified hereabove wherein coupler: (A-6)+(II-16)]

2,7-Diaminofluorenone (1.89 g) was dissolved in DMF (140 ml) and 6N hydrochloric acid (7.2 ml). To the resulting solution was added an aqueous solution (5 ml) of sodium nitrite (1.5 g) at about 5° C. After 30 minutes, the resulting diazotized solution was added dropwise to a DMF solution (180 ml) of coupler (A-6) (4.74 g), coupler (II-16) (0.38 g) and triethanolamine (9.7 g) at 5°–10° C. over a period of 20 minutes. After the solution was stirred at the same temperature for 2 hours and for further 2 hours at room temperature, the precipitate was subjected to filtration and washed with DMF and water each 900 ml.

Yield: 5.72 g Melting point: 250° C. or higher

The electrophotographic photoreceptor of the present invention contains at least one azo compound containing the coupler represented by the formula [I] or [II]. The photoreceptor may have various forms and any of them can be used in the present invention. For example, there are a photoreceptor which comprises an electrically conductive support and, provided thereon, a light-sensitive layer comprising an azo compound, a carrier transport material and a film-forming binder resin and a double-layered type photoreceptor which comprises an electrically conductive support and, provided thereon, a carrier generation layer comprising the azo compound and a binder resin and a carrier transport layer comprising a carrier transport material and a binder resin. Either of the carrier generation layer or the carrier transport layer may be the upper layer. As the carrier generation materials, substances other than the azo compound of the present invention, such as phthalocyanine, polycyclic quinone compounds, perylene compounds and squarylium compounds may be used in combination with the azo compound. The support used in the present invention includes, for example, a metal drum, a metal sheet, a paper made electrically conductive by a conducting treatment and a sheet-like, drum-like or belt-like film.

As the film-forming binder resin used for forming the light-sensitive layer on the support, there may be used various resins depending on the fields of utilization. For example, polystyrene resin, polyvinyl acetal resin, polysulfone resin, polycarbonate resin, polyester resin, polyphenylene oxide resin, polyarylate resin, acrylic resin, methacrylic resin and phenoxy resin can be used for photoreceptors used for copying. Among them, polystyrene resin, polyvinyl acetal resin, polycarbonate resin, polyester resin and polyarylate resin are excellent in potential characteristics as photoreceptors. These resins may be used each alone or in combination of two or more as copolymers.

These resins are contained in the light-sensitive layer in an amount of preferably 10–500% by weight, more preferably 50–150% by weight based on the azo pigment. If the proportion of the resin is too high, the carrier generation efficiency reduces and if it is too low, there is the problem in film-formability.

Some of these resins are low in mechanical strengths such as tensile strength, flexural strength and compression strength. In order to improve these properties, materials which impart plasticity can be added to the resins. As examples of these materials, mention may be made of phthalate esters (such as DOP and DBP), phosphate esters (such as TCP and TOP), sebacate esters, adipate esters, nitrile rubbers and chlorinated hydrocarbons. If these materials are added in an amount more than needed, the electrophotographic characteristics are adversely affected and the proportion of the material is preferably 20% or less based on the binder resin.

Moreover, if necessary, additives such as antioxidants and curling inhibitors may be added to the light-sensitive layer.

The carrier transport materials include hole transport materials and electron transport materials. As examples of the former, mention may be made of oxadiazoles shown in Japanese Patent Kokoku No. 34-5466, triphenylmethanes shown in Japanese Patent Kokoku No. 45-555, pyrazolines shown in Japanese Patent Kokoku No. 52-4188, hydrazones shown in Japanese Patent Kokoku No. 52-42380, oxadiazoles shown in Japanese Patent Kokai No. 56-123544, triarylamines shown in Japanese Patent Kokoku No. 58-32372 and stilbenes shown in Japanese Patent Kokai No. 58-198043. On the other hand, the electron transport materials include, for example, chloranil, tetracyanoethylene, 2,4,7-trinitro-9-fluorenone, 2,4,5,7-tetranitroxanthone and 1,3,7-trinitrodibenzothiophene. These carrier transport materials may be used each alone or in combination of two or more.

The following nonlimiting examples further illustrate the present invention.

EXAMPLE 1

One part by weight of the compound (21) [coupler: (A-161)+(I-16); mixing molar ratio 95:5] and 1 part by weight of a polyester resin (BYRON 200 manufactured by Toyo Boseki Co.) were mixed with 100 parts by weight of tetrahydrofuran and dispersed together with glass beads for 2 hours by a paint conditioner. The resulting dispersion was coated on an aluminum-vapor deposited polyester by an applicator to form a carrier generation layer of about $0.2\mu$ thick. Then, p-dibenzylaminobenzaldehyde-diphenylhydrazone was mixed with a polyarylate resin (U-polymer manufactured by Unitika, Ltd.) at a weight ratio of 1:1. The mixture was dissolved in dichloroethane as a solvent to prepare a 10% solution. This solution was coated on the above carrier generation layer by an applicator to form a carrier transport layer of about $20\mu$ thick.

The thus obtained double-layered photoreceptor was evaluated on the electrophotographic characteristics by an electrostatic recording tester (SP-428 manufactured by Kawaguchi Electric Mfg. Co., Ltd.).

Measuring conditions: Applied voltage: $-6$ kV, Static No. 3 (Rotational speed mode of turning table: 10 m/min)

As a result, the photoreceptor showed a charge potential $V_0$ of $-710$ V and a half decay exposure $E_{\frac{1}{2}}$ of 1.3 lux.sec. The results showed that the photoreceptor had high sensitivity. Furthermore, the charging-exposing was repeated 5000 times using the same electrostatic recording tester. As a result, substantially no changes were seen in both the charge potential and the half decay exposure.

Then, the photoreceptor was left to stand in an ozone atmosphere of 25 ppm for 5 hours and the electrophotographic characteristics were again measured by the same tester. As a result, the charge potential $V_0$ was $-690$ V and the half decay exposure $E_{\frac{1}{2}}$ was 1.3 lux.sec and thus, there were substantially no changes in the characteristics.

EXAMPLE 2

One part by weight of the compound (37) [coupler: (A-6)+(I-16); mixing molar ratio 95:5] and 100 parts by weight of tetrahydrofuran were dispersed together with glass beads for 2 hours by a paint conditioner. To the resulting dispersion were added 10 parts by weight of N-ethylcarbazole-3-carbaldehydediphenylhydrazone, 10 parts by weight of a polycarbonate resin (PCZ-200 manufactured by Mitsubishi Gas Chemical Company Inc.) and 40 parts by weight of tetrahydrofuran, followed by dispersing for 1 hour by a paint conditioner. The resulting dispersion was coated on an aluminum-vapor deposited polyester by an applicator to obtain a photoreceptor of about $20\mu$ in film thickness. The thus obtained photoreceptor was evaluated on the electrophotographic characteristics in the same manner as in Example 1 except that the applied voltage was $+5$ kV. As a result, the charge potential was $+620$ kV and the half decay exposure was 1.4 lux.sec before the ozone treatment and the charge potential was $+580$ kV and the half decay exposure was 1.4 lux.sec after the ozone treatment. Thus, the photoreceptor had excellent characteristics of high sensitivity and of less change in the characteristics.

EXAMPLES 3-8

Photoreceptors were prepared in the same manner as in Example 2 except that the azo pigments as shown in Table 4 were used and evaluated on their characteristics. The results are shown in Table 4.

TABLE 4

| Example | Azo compound (Coupler) | Mixing molar ratio of couplers | Before ozone treatment $V_0(V)$ | $E_{\frac{1}{2}}$ (*) | After ozone treatment $V_0(V)$ | $E_{\frac{1}{2}}$ (*) |
| --- | --- | --- | --- | --- | --- | --- |
| 3 | 37[(A-6) + (I-16)] | 99:1 | +650 | 1.4 | +590 | 1.3 |
| 4 | 37[(A-6) + (I-21)] | 95:5 | +660 | 1.4 | +610 | 1.4 |
| 5 | 37[(A-21) + (I-16)] | 95:5 | +650 | 1.3 | +610 | 1.3 |
| 6 | 38[(A-21) + (I-9)] | 95:5 | +750 | 1.7 | +720 | 1.7 |
| 7 | 38[(A-21) + (I-15)] | 95:5 | +760 | 2.0 | +740 | 2.0 |
| 8 | 38[(A-6) + (I-33)] | 95:5 | +720 | 1.8 | +680 | 1.8 |

*Unit: lux · sec

Comparative Example 1

A photoreceptor was prepared in the same manner as in Example 1 except that azo compound (21) containing only the coupler (A-161) and not containing the coupler (I-16) was used and was evaluated on its characteristics. As a result, the charge potential $V_0$ was $-720$ kV and the half decay exposure $E_{\frac{1}{2}}$ was 1.3 lux.sec before the ozone treatment and the charge potential $V_0$ was $-590$ kV and the half decay exposure $E_{\frac{1}{2}}$ was 1.5 lux.sec after the ozone treatment. That is, the characteristics were greatly deteriorated.

Comparative Examples 2-5

Photoreceptors were prepared in the same manner as in Example 2 except that the azo pigments as shown in Table 5 were used and evaluated on their characteristics. The results are shown in Table 5.

TABLE 5

| Comparative Example | Azo compound (Coupler) | Before ozone treatment $V_0(V)$ | $E_{\frac{1}{2}}(*)$ | After ozone treatment $V_0(V)$ | $E_{\frac{1}{2}}(*)$ |
| --- | --- | --- | --- | --- | --- |
| 2 | 37 (A-6) | +650 | 1.4 | +390 | 2.8 |
| 3 | 37 (A-21) | +650 | 1.3 | +410 | 2.5 |
| 4 | 38 (A-6) | +720 | 1.8 | +410 | 4.8 |
| 5 | 38 (A-21) | +750 | 2.0 | +420 | 4.9 |

*Unit: lux · sec

EXAMPLE 9

A photoreceptor was prepared in the same manner as in Example 1 except that compound (21) [coupler: (A-161)+(II-6); mixing molar ratio 95:5] was used as the azo pigment and was evaluated in the same manner as in Example 1.

As a result, the photoreceptor showed a charge potential $V_0$ of $-720$ V and a half decay exposure $E_{\frac{1}{2}}$ of 1.3 lux.sec. The results indicate that the photoreceptor had high sensitivity. Furthermore, the charging-exposing was repeated 5000 times using the same electrostatic recording tester. As a result, substantially no changes were seen in both the charge potential and the half decay exposure.

Then, the photoreceptor was left to stand in an ozone atmosphere of 25 ppm for 5 hours and the electrophotographic characteristics were again measured by the same tester. As a result, the charge potential $V_0$ was $-690$ V and the half decay exposure $E_{\frac{1}{2}}$ was 1.3 lux.sec and thus, there were substantially no changes in the characteristics.

EXAMPLE 10

A photoreceptor was prepared in the same manner as in Example 2 except that the compound (37) [coupler: (A-6)+(II-6); mixing molar ratio 95:5] was used as the azo pigment and the electrophotographic characteristics were evaluated in the same manner as in Example 2. As a result, the charge potential was +610 kV and the half decay exposure was 1.4 lux.sec before the ozone treatment and the charge potential was +580 kV and the half decay exposure was 1.4 lux.sec after the ozone treatment. Thus, the photoreceptor had the high sensitivity and showed less change in the characteristics.

EXAMPLES 11-16

Photoreceptors were prepared in the same manner as in Example 10 except that the azo pigments as shown in Table 6 were used and evaluated on their characteristics in the same manner as in Example 10. The results are shown in Table 6.

TABLE 6

| Example | Azo compound (Coupler) | Mixing molar ratio of couplers | Before ozone treatment $V_0(V)$ | $E_{\frac{1}{2}}$ (*) | After ozone treatment $V_0(V)$ | $E_{\frac{1}{2}}$ (*) |
| --- | --- | --- | --- | --- | --- | --- |
| 11 | 37[(A-6) + (II-6)] | 99:1 | +630 | 1.4 | +560 | 1.3 |
| 12 | 37[(A-6) + (II-4)] | 95:5 | +670 | 1.4 | +610 | 1.4 |
| 13 | 37[(A-21) + (II-6)] | 95:5 | +640 | 1.3 | +600 | 1.3 |
| 14 | 38[(A-21) + (II-5)] | 95:5 | +770 | 1.8 | +720 | 1.7 |
| 15 | 38[(A-21) + (II-24)] | 95:5 | +750 | 1.9 | +710 | 1.9 |
| 16 | 38[(A-6) + (II-18)] | 95:5 | +710 | 1.8 | +680 | 1.8 |

*Unit: lux · sec

Comparative Example 6

A photoreceptor was prepared in the same manner as in Example 9 except that azo compound (21) containing only the coupler (A-161) and not containing the coupler (II-6) was used and was evaluated on its characteristics. As a result, the charge potential $V_0$ was $-720$ kV and the half decay exposure $E_{\frac{1}{2}}$ was 1.3 lux.sec before the ozone treatment while the charge potential $V_0$ was $-590$ kV and the half decay exposure $E_{\frac{1}{2}}$ was 1.5 lux.sec after the ozone treatment. That is, the characteristics were greatly deteriorated.

Comparative Examples 7-10

Photoreceptors were prepared in the same manner as in Example 10 except that the azo pigments as shown in Table 7 were used and evaluated on their characteristics in the same manner as in Example 10. The results are shown in Table 7.

TABLE 7

| Comparative Example | Azo compound (Coupler) | Before ozone treatment $V_0(V)$ | $E_{\frac{1}{2}}(*)$ | After ozone treatment $V_0(V)$ | $E_{\frac{1}{2}}(*)$ |
| --- | --- | --- | --- | --- | --- |
| 7 | 37 (A-6) | +650 | 1.4 | +390 | 2.8 |

TABLE 7-continued

| Comparative Example | Azo compound (Coupler) | Before ozone treatment | | After ozone treatment | |
|---|---|---|---|---|---|
| | | $V_0(V)$ | $E_{\frac{1}{2}}(*)$ | $V_0(V)$ | $E_{\frac{1}{2}}(*)$ |
| 8 | 37 (A-21) | +650 | 1.3 | +410 | 2.5 |
| 9 | 38 (A-6) | +720 | 1.8 | +410 | 4.8 |
| 10 | 38 (A-21) | +750 | 2.0 | +420 | 4.9 |

*Unit: lux · sec

As explained above, the present invention provides electrophotographic photoreceptors high in sensitivity and endurance and highly resistant against oxidizing action with ozone or the like.

What is claimed is:

1. An electrophotographic photoreceptor which comprises an electrically conductive support and, provided thereon, a light-sensitive layer which contains a carrier transport material, a binder, and at least one azo compound containing a coupler component represented by the following formula or:

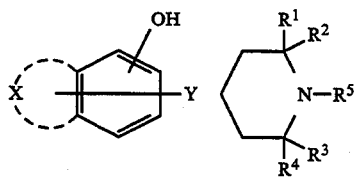

wherein X represents a heterocyclic or aromatic ring residue which may have a substituent fusing with benzene ring, Y represents a linkage group, $R^1$-$R^4$ each represents a hydrogen atom or an alkyl group and $R_5$ represents a hydrogen atom or an alkyl, aralkyl or acyl group which may have a substituent;

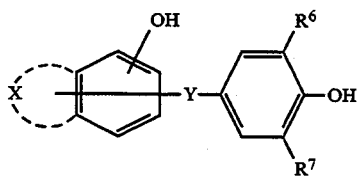

wherein X represents a heterocyclic or aromatic ring residue which may have a substituent fusing with benzene ring, Y represents a linkage group and $R^6$ and $R^7$ each represents a hydrogen atom or an alkyl group which may have a substituent.

2. An electrophotographic photoreceptor according to claim 1, wherein the azo compound contains the coupler represented by the formula or and other coupler in combination.

3. An electrophotographic photoreceptor according to claim 2, wherein the azo compound is prepared by diazotizing an amine having the following formula and reacting the resulting diazotized solution with a mixture of the coupler represented by the formula or and the other coupler in the presence of an alkali:

wherein Z represents an organic residue and n represents an integer of 1 to 4.

4. An electrophotographic photoreceptor according to claim 2 or 3, wherein the molar ratio of the coupler represented by the formula or and the other coupler is 0.1:99.9 to 20:80.

5. An electrophotographic photoreceptor which comprises an electrically conductive support and, provided thereon, a light-sensitive layer which contains both a carrier transport layer containing a binder and a carrier transport material and a carrier generation layer containing a binder, and at least one azo compound containing a coupler component represented by the following formula or:

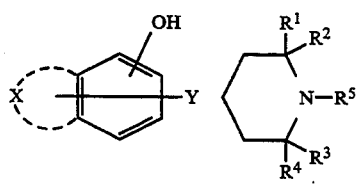

wherein X represents a heterocyclic or aromatic ring residue which may have a substituent fusing with benzene ring, Y represents a linkage group, $R^1$-$R^4$ each represents a hydrogen atom or an alkyl group and $R^5$ represents a hydrogen atom or an alkyl, aralkyl or acyl group which may have a substituent;

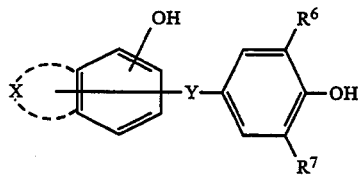

wherein X represents a heterocyclic or aromatic ring residue which may have a substituent fusing with benzene ring, Y represents a linkage group and $R^6$ and $R^7$ each represents a hydrogen atom or an alkyl group which may have a substituent.

6. An electrophotographic photoreceptor according to claim 5, wherein the azo compound contains the coupler represented by the formula and and other coupler in combination.

7. An electrophotographic photoreceptor according to claim 6, wherein the azo compound is prepared by diazotizing an amine having the following formula and reacting the resulting diazotised solution with a mixture of the coupler represented by the formula and and the other coupler in the present of an alkali:

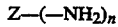

wherein Z represents an organic residue and n represents an integer of 1 to 4.

8. An electrophotographic photoreceptor according to claim 5 or 6, wherein the molar ratio of the coupler represented by the formula or and the other coupler is 0.1:99.9 to 20:80.

* * * * *